United States Patent
Csabi et al.

(10) Patent No.: US 10,654,414 B1
(45) Date of Patent: May 19, 2020

(54) SYSTEMS AND METHODS FOR DETECTING AND REDUCING DISTRACTED DRIVING

(71) Applicant: United Services Automobile Association (USAA), San Antonio, TX (US)

(72) Inventors: Rachel Csabi, Frisco, TX (US); Matthew T. Flachsbart, Grapevine, TX (US); Pooja Krishnaswamy, Cedar Park, TX (US); Nils Griswold-Steiner, Austin, TX (US); Luis Eduardo Santana, Crowley, TX (US); Bradly Jay Billman, Celina, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/509,125

(22) Filed: Jul. 11, 2019

Related U.S. Application Data (63) Continuation of application No. 16/007,705, filed on Jun. 13, 2018.

(60) Provisional application No. 62/519,512, filed on Jun. 14, 2017.

(51) Int. Cl.
*B60Q 9/00* (2006.01)
(52) U.S. Cl.
CPC ...................... *B60Q 9/00* (2013.01)
(58) Field of Classification Search
CPC ....................................... B60Q 9/00
USPC ........................................................ 340/576
See application file for complete search history.

(56) References Cited

U.S. PATENT DOCUMENTS

| | | | |
|---|---|---|---|
| 5,465,079 A | 11/1995 | Bouchard et al. | |
| 6,690,940 B1 | 2/2004 | Brown et al. | |
| 8,301,108 B2 * | 10/2012 | Naboulsi | B60R 11/0264 340/576 |
| 8,874,162 B2 * | 10/2014 | Schrader | H04W 12/08 455/550.1 |
| 9,055,509 B2 | 6/2015 | Macek et al. | |
| 9,854,086 B1 | 12/2017 | McSchooler | |
| 2006/0220915 A1 * | 10/2006 | Bauer | A61B 5/1103 340/576 |
| 2009/0029675 A1 | 1/2009 | Steinmetz et al. | |
| 2010/0113073 A1 | 5/2010 | Schlesener et al. | |
| 2012/0089442 A1 * | 4/2012 | Olsson | G06Q 30/0207 705/14.1 |
| 2014/0302834 A1 | 10/2014 | Jones | |

(Continued)

*Primary Examiner* — Eric Blount
(74) *Attorney, Agent, or Firm* — Fletcher Yoder, P.C.

(57) ABSTRACT

A method includes receiving, with one or more processors, biometric information of a first user. The method also includes determining, with the one or more processors, whether there is an indication that the first user is distracted based on the biometric information. The method further includes receiving, with the one or more processors, vehicle speed information. The method also includes determining, with the one or more processors, whether there is an indication that the first user is driving based on the vehicle speed information. The method further includes in response to determining that the first user is distracted and that the first user is driving, instructing, with the one or more processors, a mobile device associated with the first user to contact a second user or a call center.

17 Claims, 4 Drawing Sheets

(56) References Cited

U.S. PATENT DOCUMENTS

| | | | |
|---|---|---|---|
| 2015/0054639 A1* | 2/2015 | Rosen | G06K 9/00785 340/439 |
| 2016/0044575 A1 | 2/2016 | Rajeevalochana et al. | |
| 2016/0101784 A1* | 4/2016 | Olson | B60K 35/00 340/576 |
| 2016/0267335 A1* | 9/2016 | Hampiholi | G06F 3/013 |

* cited by examiner

SYSTEMS AND METHODS FOR DETECTING AND REDUCING DISTRACTED DRIVING

CROSS REFERENCE TO RELATED APPLICATIONS

This application is a continuation of U.S. patent application Ser. No. 16/007,705, filed Jun. 13, 2018, entitled "Systems and Methods for Detecting and Reducing Distracted Driving," which claims priority from and benefit of U.S. Provisional Application Ser. No. 62/519,512, filed Jun. 14, 2017, entitled "Systems and Methods for Detecting and Reducing Distracted Driving," which is hereby incorporated by reference in its entirety for all purposes.

BACKGROUND

The present disclosure relates generally to distracted driving, and more particularly to systems and methods for detecting distracted driving and performing actions to reduce distracted driving.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

A variety of factors may cause distracted driving, such as drowsiness due to lack of sleep, medication, other drugs (e.g., alcohol), and the like. It is now recognized that certain detectable characteristics may be associated with distracted driving, such as decreased oxygen levels and/or pulse, decreased vehicle speed, eye focus away from the road, excessive head movement, and the like. Further, it is now recognized that determining whether a user is distracted based on at least some of these detectable characteristics and performing actions to reduce distraction to the user may reduce instances of distracted driving.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates generally to distracted driving, and more particularly to systems and methods for detecting distracted driving and performing actions to reduce distracted driving. In some embodiments, a biometric sensor of an electronic device that detects one or more biometric characteristics (e.g., pulse or oxygen levels) of a user may indicate that the user is distracted. A vehicle speed sensor (e.g., a speedometer, an accelerometer, a location device, or a global positioning system device) of the electronic device or another electronic device (e.g., of the vehicle) may indicate that the user is operating or driving the vehicle. The electronic device may then perform an action to reduce distraction to the user, such as activating an alarm, contacting another user, a call center (e.g., associated with the user's insurance company), and the like. In this manner, distracted driving may be reduced. In additional or alternative embodiments, the electronic device may send an indication to nearby drivers within a threshold distance from the user that the user is distracted. This may alert the nearby drivers to the distracted driver, reducing traffic incidents.

Figure 1:
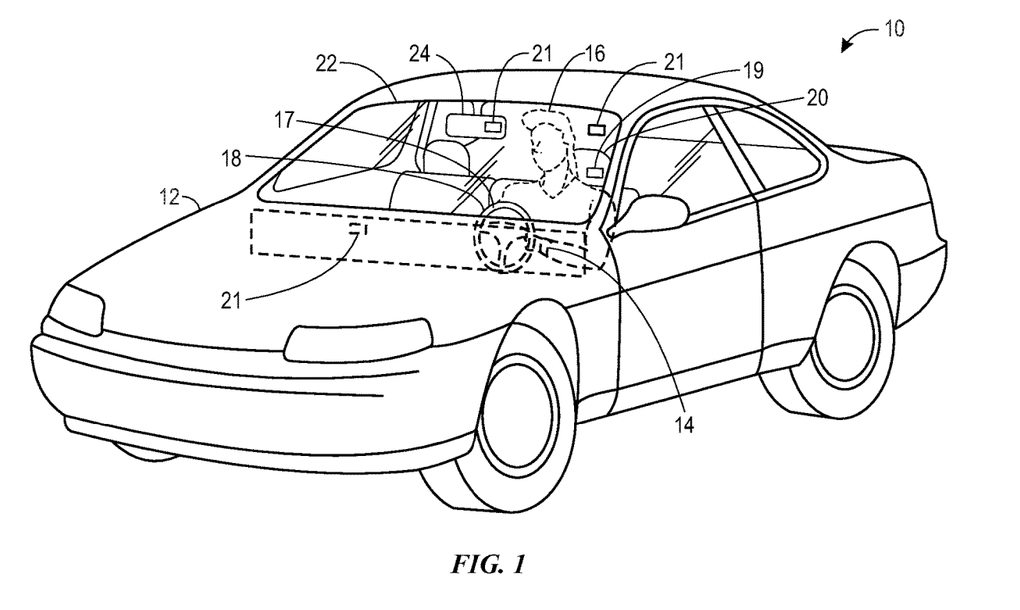
FIG. 1 is a perspective view of a distracted driving detection and reduction system used in a vehicle, in accordance with an embodiment of the present disclosure.

As an introduction, FIG. 1 is a perspective view of a distracted driving detection and reduction system 10 used in a vehicle 12, in accordance with an embodiment of the present disclosure. While the vehicle 12 is illustrated as an automobile, it should be understood that the present disclosure applies to any suitable vehicle, such as a truck, motorcycle, commercial vehicle, recreational vehicle, all-terrain vehicle, boat, airplane, snowmobile, and the like. As illustrated, the distracted driving detection and reduction system 10 includes a mobile electronic device, such as a wearable electronic device 14, of a user 16. The mobile electronic device (e.g., the wearable device 14) may be a smart electronic device (e.g., a smartwatch) that may be worn on a body of the user 16. In alternative or additional embodiments, the wearable electronic device 14 may be any suitable electronic device that may detect characteristics associated with distracted driving, such as a smartphone, a computing device, and the like. Moreover, in some embodiments, the distracted driving detection and reduction system 10 may include electronic devices that are coupled to the vehicle 12 that may detect distracted driving characteristics. For example, such electronic devices may include a pulse detection sensor 17 in a steering wheel 18 of the vehicle 12, a biometric or occupancy sensor 19 in a driver seat 20 of the vehicle 12, an eye or head detection sensor 21 (e.g., a camera) in a windshield 22, in a mirror 24, mounted on a dashboard of the vehicle 12, or the like.

Figure 2:
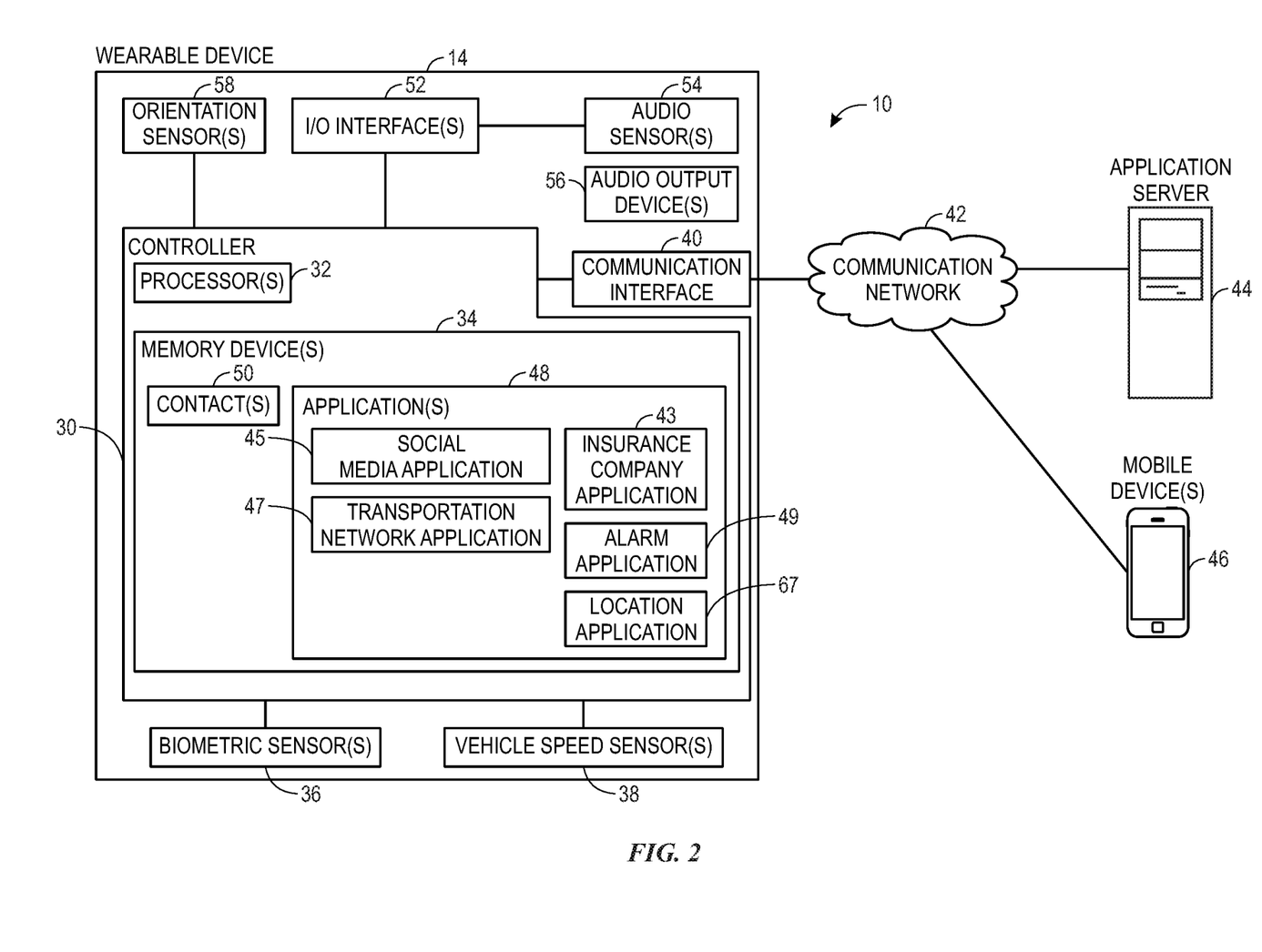
FIG. 2 is a block diagram of the distracted driving detection and reduction system of FIG. 1, in accordance with an embodiment of the present disclosure.

With this in mind, FIG. 2 is a block diagram of the distracted driving detection and reduction system 10 of FIG. 1, in accordance with an embodiment of the present disclosure. As mentioned above, the distracted driving detection and reduction system 10 includes the mobile electronic device, which is shown as the wearable device 14, which includes a controller 30. The controller 30 includes one or more processors 32 and one or more memory devices 34. The processor(s) 32 (e.g., microprocessors) may execute software programs and/or instructions to detect distracted driving characteristics of the user 16 and perform one or more actions to reduce distracted driving. Moreover, the processor(s) 32 may include multiple microprocessors, one or more "general-purpose" microprocessors, one or more special-purpose microprocessors, and/or one or more application specific integrated circuits (ASICS), or some combination thereof. For example, the processor(s) 32 may include one or more reduced instruction set computer (RISC) processors. The memory device(s) 34 may store information such as control software, look up tables, configuration data, etc. In some embodiments, the processor(s) 32 and/or the memory device(s) 34 may be external to the controller 30. The memory device(s) 34 may include a tangible, non-transitory, machine-readable-medium, such as a volatile memory (e.g., a random access memory (RAM)) and/or a nonvolatile memory (e.g., a read-only memory (ROM)). The memory device(s) 34 may store a variety of information and may be used for various purposes. For example, the memory device(s) 34 may store machine-readable and/or processor-executable instructions (e.g., firmware or software) for the processor(s) 32 to execute, such as instructions for detecting distracted driving characteristics of the user 16 and perform one or more actions to reduce distracted driving. The memory device(s) 34 may include one or more storage devices (e.g., nonvolatile storage devices) that may include read-only memory (ROM), flash memory, a hard drive, or any other suitable optical, magnetic, or solid-state storage medium, or a combination thereof. As previously noted, while FIG. 2 represents the wearable device 14, which is a mobile electronic device, in some embodiments, the components of the wearable device 14 are integrated with the vehicle 12.

The controller 30 may be coupled (e.g., wirelessly) to one or more sensors, such as one or more biometric sensors 36, which may be integrated with and/or separate from the wearable device 14. The biometric sensor(s) 36 may detect biometric information of the user 16 that may be used to determine whether the user 16 is distracted. In this disclosure, distracted may mean a state of the user 16 associated with less alertness and/or drowsiness due to, for example, lack of sleep, medication, other drugs (e.g., alcohol), and the like. Certain detectable biometric characteristics may be associated with distracted driving, such as decreased oxygen levels, decreased pulse, pupil dilation, and the like.

For example, the biometric sensor(s) 36 may detect pulse information of the user 16. In some embodiments, the processor(s) 32 may compare the pulse information to normal pulse information of the user 16. The normal pulse information of the user 16 may include an average pulse, a typical pulse of the user 16 associated with a normal state (e.g., a non-strenuous state, non-exercising state, or non-sleep state) of the user 16, and the like. The processor(s) 32 may, for example, determine whether the pulse information is within a threshold range (e.g., 5-100%, 10-50%, or 12-25%) of the normal pulse information of the user 16. If not, the processor(s) 32 may determine that the user 16 is distracted. Similar analyses may be performed for other biometric characteristics associated with distracted driving, such as oxygen level analysis, pupil size analysis, and the like.

In some embodiments, the one or more sensors may include one or more eye or head detection sensors 21 disposed in a windshield 22, in a mirror 24, mounted on a dashboard of the vehicle 12, or the like. The eye or head detection sensor(s) 21 may detect a focus of an eye or a head direction or movement of the user 16. The processor(s) 32 may, for example, determine that the user 16 is distracted because an eye detection sensor 21 indicates that the user's eyes are looking down or a head detection sensor 21 indicates that the user's head is pointed down.

The one or more sensors may include one or more vehicle speed sensors 38 that may detect a speed of the vehicle 12. In some embodiments, the vehicle speed sensor(s) 38 may include a speedometer and/or an accelerometer of the wearable device 14. The processor(s) 32 may determine the vehicle speed based on information received from the speedometer and/or the accelerometer. In alternative or additional embodiments, the vehicle speed sensor(s) 38 may include a location device, such as a global positioning system device, of the wearable device 14. For example, the processor(s) 32 may determine the vehicle speed based on comparing location information at different times received from the location device.

In some embodiments, the one or more sensors may include one or more proximity sensors of the vehicle 12. The processor(s) 32 may use the one or more proximity sensors to determine whether there are any other vehicles within a proximity (e.g., 0-50 feet or 2-25 feet) to the vehicle 12.

The controller 30 may also be communicatively coupled to a communication interface 40. The communication interface 40 may enable the controller 30 to communicate with any suitable communication network 42. For example, the communication interface 40 may enable the controller 30 to communicate with wireless networks (e.g., mobile, WiFi, LAN, WAN, or Internet). In this manner, the communication interface 40 may enable the controller 30 to communicate with, for example, an application server 44. The application server 44 may enable the user 16 to communicate with others. For example, the application server 44 may belong to the user's insurance company, and enable the user 16 to communicate with a call center and/or a representative of the insurance company (e.g., via an insurance software application 43). As another example, the application server 44 may belong to a social media network company, and enable the user 16 to communicate with another member of a social media network (e.g., via a social media software application 45). As yet another example, the application server 44 may belong to a transportation network company, and enable the user 16 to communicate with a user of a transportation network (e.g., via a transportation network software application 47). In some embodiments, one or more applications 48, such as the insurance company application 43, the social media network application 45, the transportation network application 47, an alarm application 49 that provides an alarm on the wearable device 14, and the like, may be stored in the memory device(s) 34.

The communication interface 40 may enable the controller 30 to communicate directly with one or more mobile devices 46. For example, the processor(s) 32 may use the communication interface 40 to send a message or call a contact of the user 16. In some embodiments, one or more contacts 50 of the user 16 may be stored in the memory device(s) 34. In alternative or additional embodiments, the contact(s) 50 may be stored in the application server 44 and may be accessed by the user 16 via the application(s) 48.

In some instances, the processor(s) 32 may determine the vehicle speed based on one or more sensors of the vehicle 12 communicatively coupled (e.g., wirelessly) to the processor(s) 32 via the communication interface 40. For example, the one or more vehicle sensors may include a vehicle speed sensor, a vehicle acceleration sensor, a vehicle location sensor, a vehicle wheel speed sensor, or any other suitable sensor related to operating the vehicle 12. For example, the vehicle sensor(s) may be communicatively coupled to a vehicle bus (e.g., controller area network (CAN) bus) of the vehicle 12, which may communicate with the communication interface 40. In this manner, the controller 30 may receive information from the vehicle sensor(s) and determine the vehicle speed.

The controller 30 may be communicatively coupled to one or more input/output interfaces 52 that enable the controller 30 to receive and/or transmit signals, such as audio or video signals. For example, the input/output interface 52 may enable the controller 30 to receive audio signals from one or more audio sensors 54 (e.g., microphones) of the wearable device 14. As another example, the input/output interface 52 may enable the controller 30 to transmit audio signals to one or more audio output devices 56 (e.g., speakers) of the wearable device 14.

The controller 30 may also be communicatively coupled to one or more orientation sensors 58 that enable the controller 30 to determine an orientation of the wearable device 14. For example, the one or more orientation sensors 58 may include a gyroscope that may use the Earth's gravity to determine orientation of the wearable device 14. As another example, one or more orientation sensors 58 may include an accelerometer that measures proper acceleration, or an acceleration of the wearable device 14 in its own instantaneous rest frame.

Figure 3:
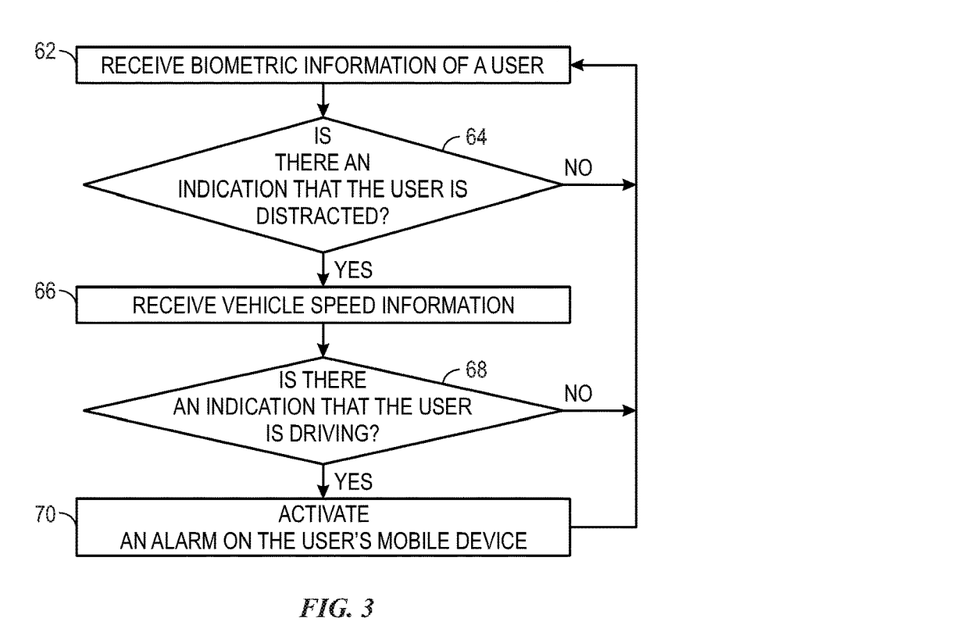
FIG. 3 is a flowchart illustrating a method for detecting and reducing distracted driving by using an alarm, in accordance with an embodiment of the present disclosure.

FIG. 3 is a flowchart illustrating a method 60 for detecting and reducing distracted driving by using an alarm, in accordance with an embodiment of the present disclosure. The method 60 may be performed by any suitable device that may control components of the distracted driving detection and reduction system 10, such as the controller 30. While the method 60 is described using steps in a specific sequence, it should be understood that the present disclosure contemplates that the described steps may be performed in different sequences than the sequence illustrated, and certain described steps may be skipped or not performed altogether. In some embodiments, the method 60 may be implemented by executing instructions stored in a tangible, non-transitory, computer-readable medium, such as the memory device(s) 34, using a processor, such as the processor(s) 32.

As illustrated, the controller 30 receives (block 62) biometric information of the user 16. Specifically, the controller 30 may receive the biometric information from the biometric sensor(s) 36 of the wearable device 14. For example, the controller 30 may receive pulse and/or oxygen level information from pulse and/or oxygen level detection sensors.

The controller 30 then determines (block 64) whether there is an indication that the user 16 is driving. Specifically, the controller 30 may determine whether there is an indication that the user 16 is distracted based at least in part on the biometric information from block 62. For example, the controller 30 may determine whether the pulse and/or oxygen level information is within a threshold range of the normal pulse and/or oxygen level information of the user 16. If so, the controller 30 may determine that the user 16 is not distracted, and the method 60 repeats. Otherwise, the controller 30 may determine that the user 16 is distracted. In alternative or additional embodiments, the controller 30 may determine whether the user 16 is distracted based on eye and/or head position or movement (e.g., using eye or head detection sensors 21 of the vehicle 12). In one embodiment, the user 16 may indicate that he or she is distracted (e.g., by providing a voice prompt to the wearable device 14). It should be understood that any suitable technique, including those discussed above, may be used to provide an indication that the user 16 is distracted. Moreover, any combination of techniques may be used to provide an indication that the user 16 is distracted, and any system of accumulating and weighting the results or values resulting from the techniques may be used to provide an indication that the user 16 is distracted.

The controller 30 also receives (block 66) vehicle speed information. Specifically, the controller 30 may receive the vehicle speed information from the vehicle speed sensor(s) 38. For example, the controller 30 may receive the vehicle speed information from a speedometer and/or an accelerometer of the wearable device 14. In some embodiments, the vehicle speed information may be provided by a location device, such as a global positioning system device, of the wearable device 14. In additional or alternative embodiments, the vehicle speed information may be provided by a location application 67 of the wearable device 14 (e.g., stored in the memory device(s) 34) via communication with, for example, an application server 44 that determines location information of the vehicle 12 over the communication interface 40. In some embodiments, the vehicle speed information may be provided by a vehicle sensor of the vehicle 12 over the communication interface 40.

The controller 30 then determines (block 68) whether there is an indication that the user 16 is driving the vehicle 12. Specifically, the controller 30 may determine whether the vehicle speed information from block 66 is within a threshold range (e.g., greater than 0, greater than 1 mile per hour, and the like) that indicates that the user 16 is driving the vehicle 12. In some embodiments, the controller 30 may determine that the user 16 is driving the vehicle 12, as opposed to being a passenger in the vehicle 12. For example, the controller 30 may request or prompt the user 16 (e.g., via an audio output device 56 such as a speaker) to answer whether he or she is driving the vehicle 12. In additional or alternative embodiments, the controller 30 may automatically determine whether the user 16 is driving the vehicle. For example, the controller 30 may communicate with a vehicle sensor of the vehicle 12 (e.g., the occupancy sensor 19 disposed in the driver seat 20 of the vehicle 12 or the pulse detection sensor 17 disposed in the steering wheel 18 of the vehicle 12) to determine a distance between the wearable device 14 and a part of the vehicle 12 associated with driving, such as the driver seat 20 or the steering wheel 18. If the distance is within a threshold distance, the controller 30 may determine that the user 16 is driving the vehicle 12. In additional or alternative circumstances, the controller 30 may determine there is an indication that the user 16 is driving the vehicle 12 based on analyzing movements of the wearable device 14 and determining whether such movements correspond to user movements typically associated with a driver. For example, an orientation sensor 58 (e.g., a gyroscope and/or an accelerometer) of the wearable device 14 may indicate that the user 16 is entering the driver side of the vehicle 12 based on the direction of movement experienced by the orientation sensor 58 (e.g., corresponding to twisting motions of the user 16 when entering the driver side of the vehicle 12). As another example, one or more audio sensors 54 (e.g., microphones) of the wearable device 14 may indicate that the user 16 is sitting in the driver seat of the vehicle 12 based on determining the direction(s) of radio sounds or road noise. It should be understood that any suitable technique, including those discussed above, may be used to provide an indication that the user 16 is driving the vehicle 12. Moreover, any combination of techniques may be used to provide an indication that the user 16 is driving the vehicle 12, and any system of accumulating and weighting the results or values resulting from the techniques may be used to provide an indication that the user 16 is driving the vehicle 12.

If the controller 30 determines that the user 16 is not driving the vehicle 12, then the method 60 repeats. Otherwise, the controller 30 determines that the user 16 is driving the vehicle 12. In some embodiments, features such as near-field communication devices may be used to confirm that the individual wearing the mobile electronic device (e.g., the wearable device 14) or otherwise being monitored by the mobile electronic device is driving. For example, such features may be used to confirm that the individual being monitored or otherwise being monitored is in the driver's seat of the vehicle 12. If this is not the case, certain actions may be implemented. For example, the vehicle 12 may not be allowed to start, incentives for using the system 10 may be halted, an alert may be provided, and the like. It should be understood that any suitable technique, including those discussed above, may be used to provide an indication that the user 16 is driving the vehicle 12. Moreover, any combination of techniques may be used to provide an indication that the user 16 is driving the vehicle 12, and any system of accumulating and weighting the results or values resulting from the techniques may be used to provide an indication the user 16 is driving the vehicle 12.

The controller 30 then activates (block 70) an alarm on the user's mobile device (e.g., the wearable device 14). For example, the wearable device 14 may include an alarm application 49 (e.g., stored in the memory device(s) 34). The controller 30 may activate an alarm of the alarm application 49 to alert the user 16. The method 60 then repeats. In this manner, the method 60 may reduce distracted driving when detecting that the user 16 is distracted.

Figure 4:
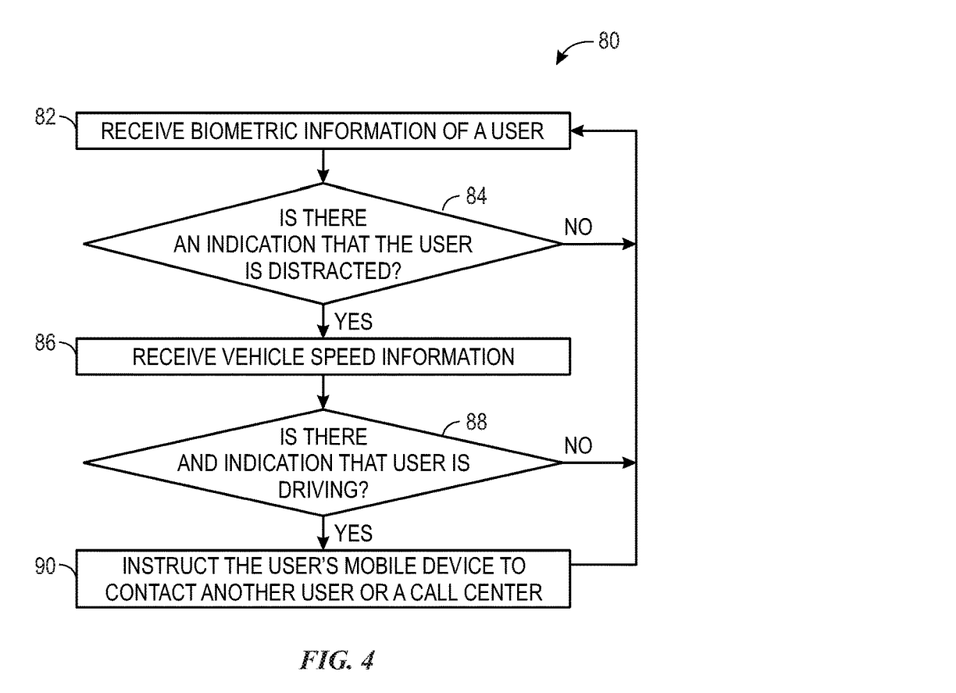
FIG. 4 is a flowchart illustrating a method for detecting and reducing distracted driving by contacting another user or a call center, in accordance with an embodiment of the present disclosure.

FIG. 4 is a flowchart illustrating a method 80 for detecting and reducing distracted driving by contacting another user or a call center, in accordance with an embodiment of the present disclosure. The method 80 may be performed by any suitable device that may control components of the distracted driving detection and reduction system 10, such as the controller 30. While the method 80 is described using steps in a specific sequence, it should be understood that the present disclosure contemplates that the described steps may be performed in different sequences than the sequence illustrated, and certain described steps may be skipped or not performed altogether. In some embodiments, the method 80 may be implemented by executing instructions stored in a tangible, non-transitory, computer-readable medium, such as the memory device(s) 34, using a processor, such as the processor(s) 32.

As with block 62 of FIG. 3, the controller 30 receives (block 82) biometric information of the user 16. As with block 64 of FIG. 3, the controller 30 then determines (block 84) whether there is an indication that the user 16 is distracted based on the biometric information. If so, the controller 30 may determine that the user 16 is not distracted, and the method 80 repeats. Otherwise, the controller 30 may determine that the user 16 is distracted. As with block 66 of FIG. 3, the controller 30 also receives (block 86) vehicle speed information. As with block 68 of FIG. 3, the controller 30 then determines (block 88) whether there is an indication that the user 16 is driving the vehicle 12. If the controller 30 determines that the user 16 is not driving, then the method 80 repeats. Otherwise, the controller 30 determines that the user 16 is driving.

The controller 30 then instructs (block 90) the user's mobile device (e.g., the wearable device 14) to contact another user or a call center. For example, the controller 30 may contact another user via the communication interface 40. In some embodiments, the controller 30 may determine the other user to contact based on the contact(s) 50 stored in the memory device(s) 34. The other user may speak with the user 16 (e.g., on a hands-free communication device, such as a microphone and speakers of the vehicle 12) to focus the user's attention on driving and reduce distraction to the user 16. In some circumstances, the user 16 may stop operating the vehicle 12 and the other user may meet the user 16 at the user's location. For example, the controller 30 may send the other user a location of the user 16 (e.g., using a location device or the location application 67 of the wearable device 14). The other user may then drive the user 16 to the user's destination, or an alternative destination.

In alternative or additional embodiments, the controller 30 may determine the identity of the other user based on the application(s) 48 stored in the memory device(s). For example, the controller 30 may use the social media application 45 to determine the identity of the other user as a member of the user's social media network and/or contact the other user using contact information associated with the identity of the other user. Again, the other user may speak with the user 16 to focus the user's attention on driving and/or meet the user 16 at the user's location to drive the user 16 to the user's destination, or an alternative destination.

As another example, the controller 30 may use the transportation network application 47 to determine the other user and/or contact the other user. In particular, the controller 30 may arrange for a driver of the transportation network to meet the user 16 at the user's location. The driver may then drive the user 16 to the user's destination, or an alternative destination.

In some embodiments, the controller 30 may use the insurance company application 43 to contact a call center of the user's insurance company. A representative of the insurance company may then speak with the user 16 to focus the user's attention on driving. In some circumstances, the representative may arrange for transportation to meet the user 16 at the user's location and drive the user 16 to the user's destination, or an alternative destination. In this manner, the method 80 may reduce distracted driving when detecting that the user 16 is distracted.

Figure 5:
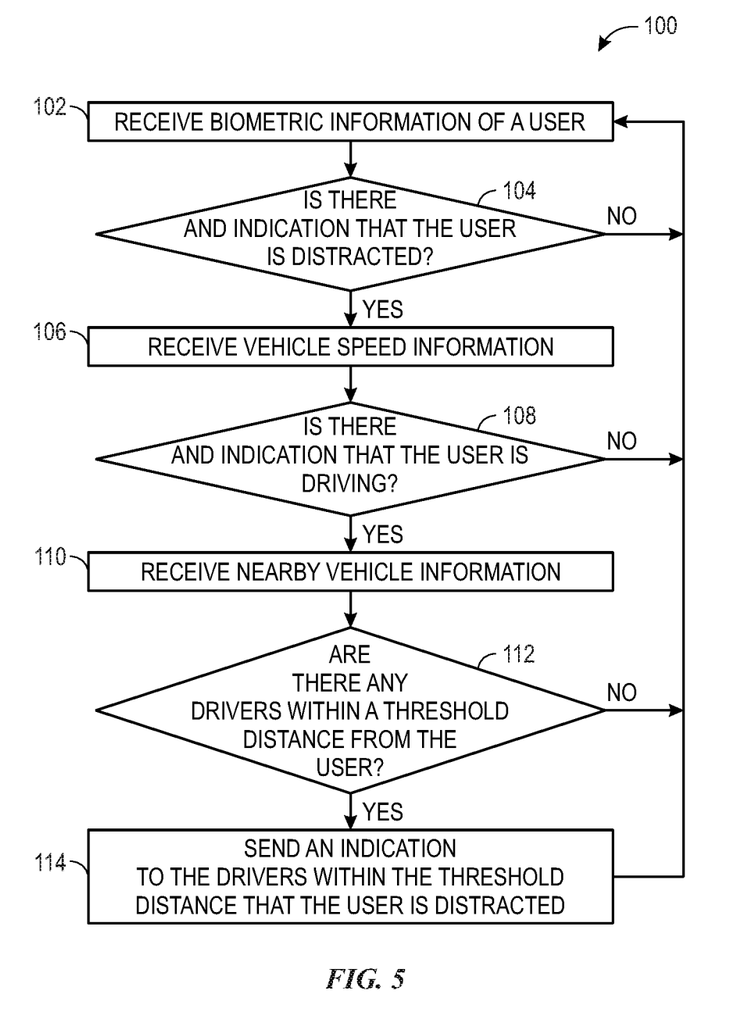
FIG. 5 is a flowchart illustrating a method for detecting distracted driving and alerting nearby drivers, in accordance with an embodiment of the present disclosure.

FIG. 5 is a flowchart illustrating a method 100 for detecting distracted driving and alerting nearby drivers, in accordance with an embodiment of the present disclosure. The method 100 may be performed by any suitable device that may control components of the distracted driving detection and reduction system 10, such as the controller 30. While the method 100 is described using steps in a specific sequence, it should be understood that the present disclosure contemplates that the described steps may be performed in different sequences than the sequence illustrated, and certain described steps may be skipped or not performed altogether. In some embodiments, the method 100 may be implemented by executing instructions stored in a tangible, non-transitory, computer-readable medium, such as the memory device(s) 34, using a processor, such as the processor(s) 32.

As with block 62 of FIG. 3, the controller 30 receives (block 102) biometric information of the user 16. As with block 64 of FIG. 3, the controller 30 then determines (block 104) whether there is an indication that the user 16 is distracted based on the biometric information. If so, the controller 30 may determine that the user 16 is not distracted, and the method 100 repeats. Otherwise, the controller 30 may determine that the user 16 is distracted. As with block 66 of FIG. 3, the controller 30 also receives (block 106) vehicle speed information. As with block 68 of FIG. 3, the controller 30 then determines (block 108) whether there is an indication that the user 16 is driving the vehicle 12. If the controller 30 determines that the user 16 is not driving the vehicle 12, then the method 100 repeats. Otherwise, the controller 30 determines that the user 16 is driving the vehicle 12.

The controller 30 then receives (block 110) nearby vehicle information. The controller 30 may thus determine (block 112) whether any vehicles or drivers are within a threshold distance of the user 16. For example, the controller 30 may use the proximity sensor(s) of the vehicle 12 to determine whether there are any nearby vehicles within a threshold distance (e.g., 0-50 feet or 2-25 feet) to the vehicle 12. As another example, the controller 30 may communicate with mobile devices of drivers of the nearby vehicles and/or communication devices of the nearby vehicles to determine whether there are any nearby vehicles within the threshold distance. If not, the controller 30 determines there are no nearby vehicles within the threshold distance, and the method 100 repeats. Otherwise, the controller 30 determines there are nearby vehicles within the threshold distance.

The controller 30 then sends (block 114) an indication to the drivers within the threshold distance that the user 16 is distracted. Specifically, the controller 30 may send the indication (e.g., a message) to mobile devices of the drivers of the nearby vehicles and/or the communication devices of the nearby vehicles. The drivers may receive the indication via any suitable method or device. For example, the mobile devices of the drivers may communicate the indication via speakers of the mobile devices. Similarly, the nearby vehicles may communicate the indication via speakers of the nearby vehicles. In some embodiments, the controller 30 may activate components and/or devices of the vehicle 12 to signal the drivers of the nearby vehicles (e.g., by activating hazard lights of the vehicle 12).

In some embodiments, the controller 30 may send the indication via the application(s) 48 stored in the memory device(s) 34. For example, if the user 16 and a nearby driver both have the insurance company application 43 installed on their respective mobile devices, the controller 30 may send the indication via the insurance company application 43 from the user's wearable device 14 to the nearby driver's mobile device. In this manner, the method 100 may detect distracted driving and alert nearby drivers of the distracted driver.

In some embodiments, nearby drivers (including the user 16) may communicate with one another to alert each other to vehicle conditions, using the various communication methods disclosed. For example, the user 16 may notice a tail light of a nearby driver's vehicle is not working. The user 16 may then send an indication to the nearby driver (via the nearby driver's mobile device and/or the nearby vehicle's communication device) that the tail light is not working. In the example above, where the user 16 and a nearby driver both have the insurance company application 43 installed on their respective mobile devices, the controller 30 may send the indication via the insurance company application 43 from the user's wearable device 14 to the nearby driver's mobile device. In this manner, drivers may notify each other of vehicle conditions. This may be achieved by associating location data with users in real-time, by associating license plate data, and so forth. For example, a user may identify an issue and identify the vehicle associated with the issue (e.g., by identifying the vehicle on a map provided by an application 48 of the wearable device 14, taking a photo of the vehicle, taking a photo of the license plate of the vehicle, providing license plate information through their mobile electronic device, and the like) and indicate the issue (e.g., a broken light). In some embodiments, the user may identify the vehicle after selecting the vehicle from a list of nearby vehicles (e.g., provided based on a geographic location of the vehicle 12 and vehicles within a threshold distance from the vehicle 12). The indication may facilitate identifying the location and associate it with a user for communication.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system that detects and reduces distracted driving comprising:
   a mobile electronic device communicatively coupled to a biometric sensor and a vehicle speed sensor, wherein the biometric sensor is configured to detect biometric information of a driver in a vehicle, wherein the vehicle speed sensor is configured to detect vehicle speed information of the vehicle, and wherein the mobile electronic device comprises one or more processors configured to:
   determine that the driver is distracted based at least in part on the biometric information;
   determine that the driver is driving the vehicle based at least in part on the vehicle speed information; and
   in response to determining that the driver is distracted and driving, send an indication that the driver is distracted to a member of a social media network of the driver via a social media network software application.

2. The system of claim 1, wherein the biometric information of the driver is a measure of one or more pupils of the driver.

3. The system of claim 1, wherein the one or more processors is configured to determine that the driver is distracted in response to performing pupil size analysis on one or more pupils of the driver.

4. The system of claim 1, wherein the biometric information of the driver comprises pulse information of the driver, and wherein the one or more processors is configured to determine that the driver is distracted in response to determining that the pulse information is not within a threshold range of a normal pulse of the driver.

5. The system of claim 1, wherein the biometric information of the driver comprises oxygen level information of the driver, and wherein the one or more processors is configured to determine that the driver is distracted in response to determining that the oxygen level information is not within a threshold range of a normal oxygen level of the driver.

6. A method that detects and reduces distracted driving comprising:
- receiving, with one or more processors, biometric information of a user in a vehicle;
- determining, with the one or more processors, that the user is distracted based at least in part on the biometric information;
- receiving, with the one or more processors, vehicle speed information of the vehicle;
- receiving, with the one or more processors, a location of the user;
- determining, with the one or more processors, that the user is driving the vehicle based at least in part on the vehicle speed information; and
- in response to determining that the user is distracted and that the user is driving, instructing, with the one or more processors, a mobile device associated with the user to send the location of the user and an indication that the user is distracted and driving to a computing device via a software application that is stored on the mobile device and the computing device, wherein the software application is an insurance company application.

7. The method of claim 6, comprising contacting, with the one or more processors, a call center of an insurance company associated with the insurance company application via the insurance company application.

8. The method of claim 6, wherein determining, with the one or more processors, that the user is driving comprises requesting that the user indicate whether the user is driving the vehicle.

9. The method of claim 6, wherein determining, with the one or more processors, that the user is driving comprises determining a distance between the mobile device and a sensor of the vehicle.

10. The method of claim 6, wherein the biometric information of the user comprises eye position or eye movement information of the user, and wherein determining, with the one or more processors, that the user is distracted is based at least in part on analysis of the eye position or eye movement information.

11. The method of claim 6, wherein the biometric information of the user comprises head position or head movement information of the user, and wherein determining, with the one or more processors, that the user is distracted is based at least in part on analysis of the head position or head movement information.

12. One or more tangible, non-transitory, machine-readable media comprising instructions that detect and reduce distracted driving, wherein the instructions are configured to cause a processor of a mobile device to:
- receive biometric information of a user in a first vehicle;
- determine that the user is distracted based at least in part on the biometric information;
- receive vehicle speed information of the first vehicle;
- determine that the user is driving the first vehicle based at least in part on the vehicle speed information;
- determine that a second vehicle is within a threshold distance from the first vehicle; and
- in response to determining that the user is distracted, the user is driving, and the second vehicle is within the threshold distance from the first vehicle, send an indication to one or more speakers disposed in a second vehicle that the user is distracted.

13. The one or more tangible, non-transitory, machine-readable media of claim 12, wherein the second vehicle comprises the one or more speakers.

14. The one or more tangible, non-transitory, machine-readable media of claim 12, wherein a second mobile device is disposed in the second vehicle, wherein the second mobile device comprises the one or more speakers.

15. The one or more tangible, non-transitory, machine-readable media of claim 12, wherein the instructions configured to cause the processor to determine that the second vehicle is within the threshold distance from the first vehicle comprise instructions for receiving nearby vehicle information from one or more proximity sensors of the first vehicle.

16. The one or more tangible, non-transitory, machine-readable media of claim 12, wherein the instructions configured to cause the processor to determine that the second vehicle is within the threshold distance from the first vehicle comprise instructions for communicating with a second mobile device or a communication device of the second vehicle.

17. The method of claim 6, wherein determining, with the one or more processors, that the user is distracted comprises:
- applying a weight to the biometric information; and
- accumulating the weight with additional weights.

* * * * *